(12) United States Patent
Lerner et al.

(10) Patent No.: US 6,826,235 B2
(45) Date of Patent: Nov. 30, 2004

(54) ROBUST COMMUNICATIONS SYSTEM UTILIZING REPETITION CODE AND CUMULATIVE DECODER ASSOCIATED THEREWITH

(75) Inventors: Gregory Lerner, Beer Sheva (IL); Dan Raphaeli, Kfar Saba (IL); Oren Kaufman, Beer Sheva (IL); Boris Zarud, Beer Sheva (IL)

(73) Assignee: Itran Communications Ltd., Beersheva (IL)

( * ) Notice: Subject to any disclaimer, the term of this patent is extended or adjusted under 35 U.S.C. 154(b) by 54 days.

(21) Appl. No.: 10/035,119

(22) Filed: Jan. 4, 2002

(65) Prior Publication Data

US 2003/0128746 A1 Jul. 10, 2003

(51) Int. Cl.[7] .............................................. H04L 23/02
(52) U.S. Cl. ...................................... 375/262; 375/222
(58) Field of Search ................................ 375/219, 220, 375/142, 150, 341, 343, 340, 262; 714/791, 792, 794, 795, 759

(56) References Cited

U.S. PATENT DOCUMENTS

| 5,430,738 | A | | 7/1995 | Tsuda ........................... 714/748 |
|---|---|---|---|---|
| 5,968,198 | A | * | 10/1999 | Hassan et al. ................ 714/752 |
| 6,064,695 | A | | 5/2000 | Raphaeli ....................... 375/230 |
| 6,111,910 | A | * | 8/2000 | Cui et al. ...................... 375/142 |
| 6,130,895 | A | | 10/2000 | Tannhauser .................. 370/468 |
| 6,130,923 | A | * | 10/2000 | Levin et al. .................. 375/347 |
| 6,148,042 | A | * | 11/2000 | Zehavi et al. ................ 375/340 |
| 6,175,391 | B1 | * | 1/2001 | Kwak ........................... 348/725 |
| 6,182,261 | B1 | * | 1/2001 | Haller et al. ................. 714/758 |
| 6,215,827 | B1 | * | 4/2001 | Balachandran et al. ..... 375/262 |
| 6,233,273 | B1 | * | 5/2001 | Webster et al. .............. 375/148 |
| 6,366,624 | B1 | * | 4/2002 | Balachandran et al. ..... 375/341 |
| 6,414,945 | B1 | * | 7/2002 | Chennakeshu et al. ..... 370/317 |
| 6,556,634 | B1 | * | 4/2003 | Dent ............................ 375/343 |
| 6,597,923 | B1 | * | 7/2003 | Vanghi et al. ............... 455/522 |
| 6,671,852 | B1 | * | 12/2003 | Ariel et al. .................. 714/793 |
| 6,697,441 | B1 | * | 2/2004 | Bottomley et al. .......... 375/340 |

OTHER PUBLICATIONS

U.S. application 09/449,880, filed Nov. 30, 1999, "A Code Shift Keying Transmiter For Use In A Spread Spectrum Communications System", Raphaeli et al.
U.S. application 09/551,449, filed Apr. 18, 2000, "A Receiver For Use In A Code Shift Keying Spread Spectrum Communications System", Raphaeli et al.
U.S. application 09/686,237, filed Oct. 11, 2000, "Soft Decision Maxi, um Likelihood Encoder and Decoder", Raphaeli et al.

* cited by examiner

Primary Examiner—Emmanuel Bayard
(74) Attorney, Agent, or Firm—Howard Zaretsky; Zaretsky & Associates PC

(57) ABSTRACT

A novel robust communications scheme whereby a repetition code at the transmitter and an associated cumulative decoder at the receiver are used to increase the reliability of transmission in a communications system. The robust communications scheme of the present invention is effective to increase the reliability of transmission by repetitively transmitting each data segment a number of times in accordance with a repetition code and subsequently collecting the received energy at the receiver over an accordingly longer period of time. Accumulating the received energy over a longer period of time at the receiver, yields a marked improvement in the signal to noise ratio (SNR) of the receiver.

53 Claims, 5 Drawing Sheets

ROBUST COMMUNICATIONS SYSTEM UTILIZING REPETITION CODE AND CUMULATIVE DECODER ASSOCIATED THEREWITH

FIELD OF THE INVENTION

The present invention relates generally to data communication systems and more particularly relates to a cumulative decoder and transceiver constructed therefrom for providing robust communications over noisy media such as power line based networks.

BACKGROUND OF THE INVENTION

Digital data communications systems are currently being used more and more to transmit and receive data between remote locations. The reliability and integrity of the data being communicated is an important part of any data communications system. in the ideal case, the data being transmitted should be identical to the data being received at the receiving location. In reality, however, the data received at the receiving location is oftentimes corrupted with respect to the original data transmitted. Any data communication errors are usually attributed to one or more of the transmission equipment, transmission medium or receiving equipment. With respect to the transmission medium, these types of data errors are usually attributed to the less than ideal conditions associated with the particular transmission medium.

For example, communication systems designed to transmit and receive using power line carrier techniques are subjected to the non-optimum conditions imposed by the power line medium. The power line medium is an unstable medium characterized by much pulse noise, continuous wave (CW) interference and impedance modulation. Depending on the length of the symbols used to transmit packets, the channel may not be assumed to be static during a packet time.

In many communications systems, especially those designed for use with the power line, some kind of error correcting code (ECC) is typically employed. Data communications systems often rely on error detection or error correction schemes to detect the occurrence of a data error or to correct a data error. As is known by practical tests, the most critical problem imposed by the power line that a modem must deal with is impedance modulation. The power line impedance modulation may be modeled as signal elimination at a 20% duty cycle periodically at a rate of 100 Hz for 50 Hz AC lines or 120 Hz for 60 Hz AC lines. Thus, any error correcting code employed must be robust enough to overcome this problem.

Often, however, it is desirable to achieve even higher levels of reliability over and above the level of reliability attainable from the particular components making up the communications system, e.g., receivers transmitter, error correcting code, acquisition scheme, etc. For example, the reliability is determined largely by the individual reliabilities that are characteristic of the modulation scheme, any error correcting code used, the acquisition scheme, etc.

In addition, in most systems, it is likely that the reliabilities of the various components making up the communications system are not equal. Thus, some components are able to achieve higher levels of reliability that others. It is desirable that the reliability of transmission be held as close as possible to a steady state value throughout the transmission of the message, e.g., packet, frame, etc. In particular, it is preferable that the reliability of acquisition and that of data reception be the same throughout the packet. Once a decision has been made to get into a packet (i.e. proceed with reception), it is desirable to have a reasonable assuredness that the packet will be received correctly.

There is thus a need for a mechanism of increasing the reliability of transmission in a communications system to achieve highly robust communications. In addition, there is a need for a mechanism for achieving the same level of reliability of correct reception for all portions of a packet transmission.

SUMMARY OF THE INVENTION

The present invention is a novel robust communications scheme whereby a repetition code at the transmitter and an associated cumulative decoder at the receiver are used to increase the reliability of transmission in a communications system. The robust communications scheme of the present invention is effective to increase the reliability of transmission by repetitively transmitting each data segment a number of times in accordance with a repetition code and subsequently collecting the received energy at the receiver over an accordingly longer period of time. Accumulating the received energy over a longer period of time at the receiver yields a marked improvement in the signal to noise ratio (SNR) of the receiver.

Note that in many cases, one skilled in the communication arts can easily modify an existing transceiver design to incorporate the present invention in order to achieve a boost in the reliability of transmission. In the transmitter, a repetition code is implemented whereby each transmit segment is transmitted a predetermined number of times in accordance with the repetition code that is known to both the transmitter and receiver. At the receiver, the existing decoder is modified to accumulate the received energy over a plurality of transmit segments thus improving the reliability of transmission. Note that the tradeoff for improved transmission reliability is a corresponding decrease in data rate due to the use of the repetition code.

An application of the present invention is in systems whereby it is desirable to equalize the reliability of the various portions of the packet. For example, consider a packet acquisition algorithm that is capable of acquiring synchronization with four symbol errors out of seven symbols wherein the data ECC encoding/decoding scheme is able to correct three symbol errors out of seven. Thus, the difference in performance of the acquisition algorithm and the ability of the ECC to correctly receive the data is approximately 6 dB. In one embodiment, the robust mode of the present invention comprises the combination of error correction code and a repetition code (including associated cumulative decoder in the receiver) which functions to collect the energy of the received signal over a longer period of time, i.e. several codewords, symbols, bits, etc. thus yielding a marked improvement in receiver SNR.

Many aspects of the invention may be constructed as software objects that execute in embedded devices as firmware, software objects that execute as part of a software application on a computer system running either a real time operating system such as WinCE, Symbian, etc. or a non-real time operating system such as Windows, UNIX, LINUX, etc., or as soft core realized VHDL circuits embodied in an Application Specific Integrated Circuit (ASIC), Field Programmable Gate Array (FPGA) or functionally equivalent discrete hardware components.

There is therefore provided in accordance with the present invention a method of cumulatively decoding input metrics corresponding to a demodulated received signal originally transmitted as a sequence of segments repeated a predetermined number of times, the method comprising the steps of summing the input metrics with weighted metrics so as to generate cumulative metrics therefrom, applying a hard decision algorithm to the cumulative metrics and generating hard decisions and updated metrics associated with the hard decisions in response to the cumulative metrics, accumulating the updated metrics associated with the hard decisions over a plurality of segments and applying a weighting function so as to generate the weighted metrics therefrom and repeating the steps of summing, applying and accumulating one or more times.

There is also provided in accordance with the present invention a cumulative decoder for decoding input metrics corresponding to a demodulated received signal originally transmitted as a sequence of segments repeated a predetermined number of times comprising summing means adapted to sum the input metrics with cumulative metrics generating summed metrics therefrom, search means for applying a hard decision algorithm to the summed metrics and generating hard decisions and updated metrics associated with the hard decisions in response thereto, accumulating means for accumulating the updated metrics generated by the search means over a plurality of segments so as to generate the cumulative metrics therefrom and wherein the updated metrics are generated and accumulated over the predetermined number of segments.

There is further provided in accordance with the present invention a cumulative decoder for decoding input correlation values corresponding to a demodulated received signal originally transmitted as a sequence of codewords repeated a one or more times comprising summing means adapted to sum the input correlation values with cumulative correlation values so as to yield summed correlation values therefrom, search means adapted to perform a maximum search on the summed correlation values and to generate one or more maximum values corresponding to hard decisions and updated correlation values in response thereto, accumulating means for accumulating the updated correlation values generated by the search means over a plurality of codewords so as to generate the cumulative correlation values therefrom and wherein for each output codeword, the cumulative correlation values are accumulated over one or more codewords.

There is also provided in accordance with the present invention a method of cumulative decoding input correlation values corresponding to a demodulated received signal originally transmitted as a sequence of codewords repeated one or more times comprising summing the input correlation values with cumulative correlation values so as to yield summed correlation values therefrom, performing a maximum search on the summed correlation values and generating one or more maximum values corresponding to hard decisions and updated correlation values in response thereto, accumulating the updated correlation values generated by the search means over a plurality of codewords so as to generate the cumulative correlation values therefrom and wherein for each output codeword, the cumulative correlation values are accumulated over one or more codewords.

There is further provided in accordance with the present invention a method of robust communications in a shared communications media based network wherein transmit data is encoded using a predetermined error correcting code (ECC) and repeatedly transmitting the encoded data N times, the method comprising the steps of generating a demodulated signal from a signal received over the network, iteratively decoding the demodulated signal N times to generate cumulative metrics, thereby accumulating energy in the received signal over a period of time N times longer than the original transmit data, performing soft decision decoding on the cumulative metrics so as to generate output data therefrom and wherein N is a positive integer.

There is also provided in accordance with the present invention a modem transceiver for transmitting and receiving signals in a shared communications media based network comprising a coupling circuit for generating a receive signal received over the network and for outputting a transmit signal onto the network, a transmitter adapted to modulate data to be transmitted in accordance with a modulation scheme so as to generate a transmit waveform therefrom, the transmitter comprising a segment repeater adapted to repeatedly transmit each input segment a predetermined number of times, a receiver adapted to demodulate the receive signal in accordance with the modulation scheme so as to generate a receive data signal therefrom, the receiver comprising a cumulative decoder for decoding input metrics corresponding to a demodulated received signal originally transmitted as a sequence of segments repeated one or more times, the cumulative decoder comprising summing means adapted to sum the input metrics with cumulative metrics to yield summed metrics therefrom, search means for applying a hard decision algorithm to the summed metrics and generating hard decisions and updated metrics associated with the hard decisions in response thereto, accumulating means for accumulating the updated metrics generated by the search means over a plurality of segments so as to generate the cumulative metrics therefrom. wherein for each output segment generated, updated metrics are generated and accumulated over one or more segments, a media access control (MAC) circuit adapted to interface an application processor to the shared communications media and the application processor adapted to control the operation of the transmitter, receiver and MAC and to provide an interface between the MAC and an external host.

BRIEF DESCRIPTION OF THE DRAWINGS

The invention is herein described, by way of example only, with reference to the accompanying drawings, wherein.

DETAILED DESCRIPTION OF THE INVENTION

Figure 1:
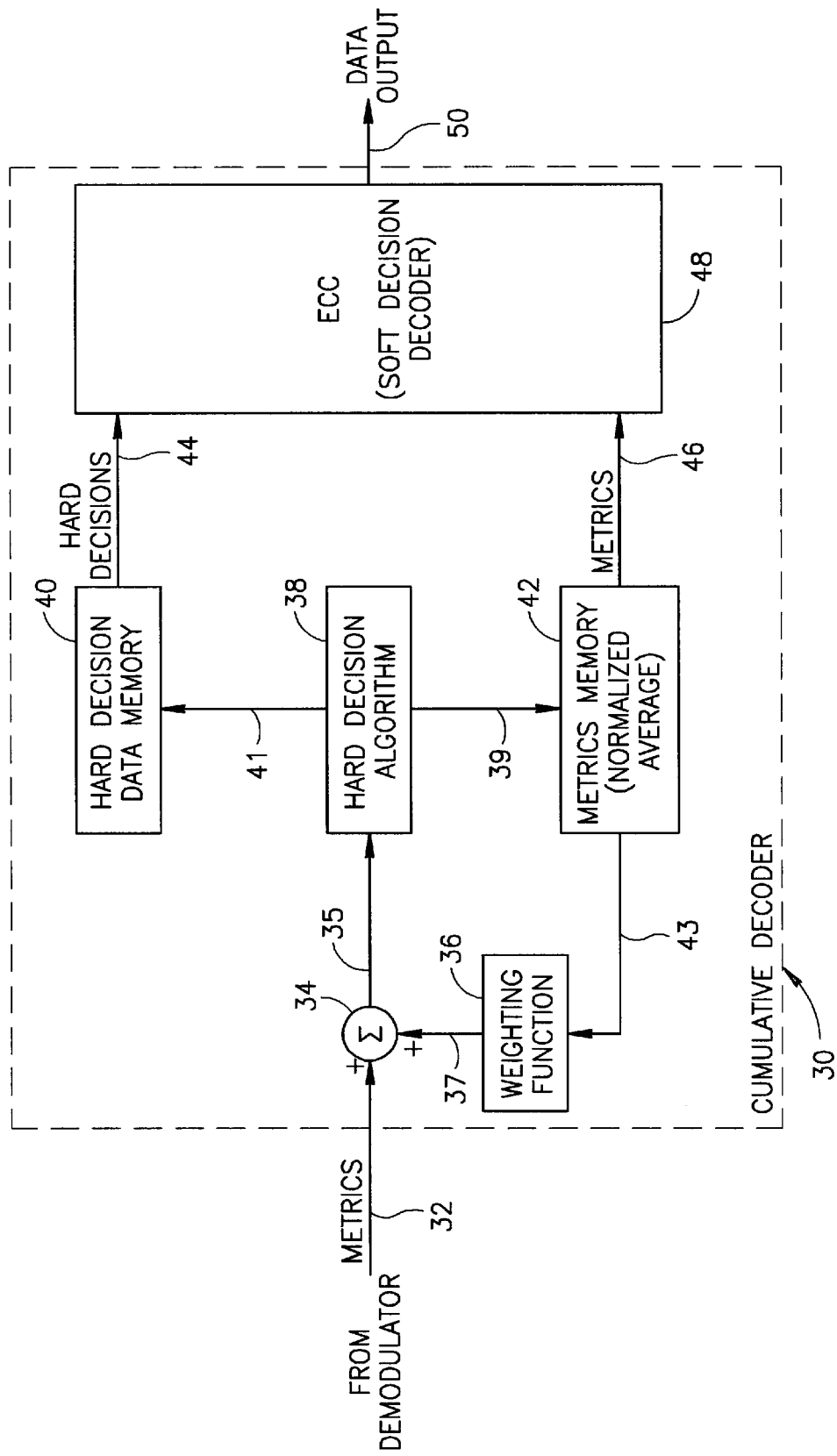
FIG. 1 is a diagram of a first embodiment of a cumulative decoder constructed in accordance with the present invention adapted to output hard decisions and associated metrics to a soft decision decoder.

Notation Used Throughout
The following notation is used throughout this document.

| Term | Definition |
| --- | --- |
| AC | Alternating Current |
| ASIC | Application Specific Integrated Circuit |
| BPF | Band Pass Filter |
| CRC | Cyclic Redundancy Code |
| CSK | Code Shift Keying |
| CW | Continuous Wave |
| DCSK | Differential Code Shift Keying |
| ECC | Error Correcting Code |
| FPGA | Field Programmable Gate Array |
| IR | Infrared |
| LAN | Local Area Network |
| LSB | Least Significant Bit |
| MAC | Media Access Control |
| MAN | Metropolitan Area Network |
| ML | Maximum Likelihood |
| MSB | Most Significant Bit |
| OSI | Open Systems Interconnect |
| PAN | Personal Area Network |
| PLC | Power Line Carrier |
| PLL | Phase Lock Loop |
| PN | Pseudo random Noise |
| RAM | Random Access Memory |
| RF | Radio Frequency |
| ROM | Read Only Memory |
| SNR | Signal to Noise Ratio |
| UST | Unit Symbol Time |
| VHDL | VLSI Hardware Description Language |
| WAN | Wide Area Network |

Detailed Description of the Invention

The present invention is a robust communications scheme whereby a repetition code at the transmitter and an associated cumulative decoder at the receiver are used to increase the reliability of transmission in a communications system. The robust communications scheme of the present invention is effective to increase the reliability of transmission by repetitively transmitting each data segment a number of times in accordance with a repetition code and subsequently collecting the received energy at the receiver over an accordingly longer period of time. Accumulating the received energy over a longer period of time at the receiver, yields a marked improvement in the signal to noise ratio (SNR) of the receiver.

Note that in many cases, one skilled in the communication arts can easily modify an existing transceiver design to incorporate the present invention in order to achieve a boost in the reliability of transmission. In the transmitter, a repetition code is implemented whereby each transmit segment is transmitted a predetermined number of times in accordance with the repetition code. At the receiver, the existing decoder is modified to accumulate the received energy over a plurality of transmit segments thus improving the reliability of transmission. Note that the tradeoff for improved transmission reliability is a corresponding decrease in data rate due to the use of the repetition code.

The mechanism of the present invention is particularly useful in communication systems characterized by consecutively transmitted segments, e.g., codewords made up of a plurality of symbols. Moreover, the mechanism of the present invention is especially useful in communication systems that utilize the power line as the transmission medium. The robust communications mechanism may be used in power line carrier based systems to improve the reliability of transmission by increasing the probability of correct reception of data.

Throughout this document, the term 'station,' 'node' or 'communication node' shall be taken to mean any network entity, implemented in either hardware, software or a combination of hardware and software, which may be the endpoint of a call, link or connection within a shared media based network. The network may comprise any type of shared network or media including but not limited to power line carrier based networks, twisted pair networks, IR wireless networks, RF wireless networks, optical fiber ring networks, etc.

The term 'call,' 'link' or 'connection' shall be taken to mean any communication path that is established between at least two nodes for the purpose of communication therebetween.

The term 'transmission segment,' 'transmit segment,' 'transmission unit,' 'transmit unit' or 'transmit data' shall be taken to mean the basic element or constituent of transmission. For example, transmission segments may comprise codewords, symbols, bits or any other basic element of transmission.

The term 'encoded data' shall be taken to mean transmit data that has been processed by an encoder and output therefrom. Examples of encoders include parity encoder, block encoder, Even Odd symbol parity encoder, Reed-Solomon encoder, convolutional encoder, etc.

The term 'transmit waveform' shall be taken to mean the spreading waveform modulated to convey information in accordance with the data to be transmitted. For example, the spreading waveform may comprise a chirp or PN sequence circularly shifted in accordance with the data.

The term 'symbol' is defined as a unit of information that is conveyed in a single transmit waveform. A symbol may represent one or more bits in accordance with the particular implementation.

The term 'codeword' is defined as a set of symbols comprising one or more data symbols and one or more corresponding encoded parity symbols which are generated via a data encoding process. The data and parity symbols together make up a codeword. Note that the term codeword as used in this document is meant to refer to an example communication scheme that encodes data into codewords for transmission over the channel. The invention is not to be limited to systems that use codewords to transmit information, as information may be transmitted without encoding.

An example application of the robust communications system of the present invention is with use in a spread spectrum data communications system that utilizes the Differential Code Shift Keying (DCSK) or non-differential Code Shift Keying (CSK) modulation technique. Such communications systems are applicable to relatively noisy environments such as the AC power line. To aid in illustrating the principles of the present invention, the robust communication system is described in the context of a near baseband spread spectrum communication system utilizing CSK modulation. Note that the invention is not limited to this modulation, as one skilled in the art can apply the robust communication system described herein to other types of communication systems and other types of modulation as well.

In a CSK transmission system, the data is transmitted in the form of time shifts between consecutive circularly rotated waveforms of length T which are referred to as spreading waveforms, i.e., spread spectrum correlator sequence waveforms. The spreading waveforms can comprise any type of waveform that has suitable auto correlation properties. During each symbol period, referred to as a unit symbol time (UST), a plurality of bits are transmitted. The symbol period is divided into a plurality of shift indexes with each shift index representing a particular bit pattern. The information, i.e., bit pattern, is conveyed by rotating the spreading waveform by a certain amount corresponding to the data to be transmitted. The data is conveyed in the degree of rotation or circular shift applied to the spreading waveform before it is transmitted. Note that the spreading waveform may comprise any suitable waveform such as a chirp, pseudorandom sequence, etc.

In a CSK system, the data is conveyed in the absolute shift assigned to the spreading waveform. In a DCSK system, the data is conveyed in the shift differential between consecutive symbols. The interleaver/de-interleaver scheme of the present invention is applicable to both CSK and DCSK transmission systems.

Upon reception by the receiver, the signal is input to a matched filter having a template of the spreading waveform pattern to detect the amount of rotation (or circular shift) within the received signal for each symbol. The received data is fed into a cyclic correlator wherein the contents are periodically circularly shifted and a correlation output generated therefrom. Cyclic correlation may be achieved by inputting the received data to a shift register whose output is fed back to its input and circularly rotating, i.e., shifting, the contents of the shift register. The parallel output of the shift register is input to a matched filter. For each bit shift or rotation, the matched filter generates a correlation sum. A shift index is determined for each UST corresponding to the shift index that yields the maximum (or minimum) correlation sum. Differential shift indexes are generated by subtracting the currently received shift index from the previously received shift index. The differential shift index is then decoded to yield the originally transmitted data.

Spread spectrum communications systems based on DCSK or CSK modulation are described in more detail in U.S. Pat. No. 6,064,695, to Raphaeli, entitled "Spread Spectrum Communication System Utilizing Differential Code Shift Keying," incorporated herein by reference in its entirety. Note, however, that one skilled in the communication arts may apply the techniques of the present invention to other modulation techniques as well.

Generalized Cumulative Decoder

The robust communications mechanism of the present invention comprises a repetition code implemented in the transmitter in combination with a corresponding cumulative decoder in the receiver. In accordance with the repetition code, each transmit segment, e.g., codeword, symbol, etc. is transmitted a predetermined number of times. The repetition code used in the transmitter must be known a priori or conveyed to the receiver.

A diagram of a first embodiment of a cumulative decoder constructed in accordance with the present invention adapted to output hard decisions and associated metrics to a soft decision decoder is shown in FIG. 1. The cumulative decoder, generally referenced 30, comprises a generalized structure that is not limited to any particular modulation and is suitable for use with a wide variety of communication schemes. A second embodiment cumulative decoder intended for spread modulation based schemes is also described in more detail infra.

The decoder 30 comprises a hard decision algorithm 38, hard decision data memory 40 (e.g., RAM), metric memory 42, optional weighting function 36 and summer 34. The input to the decoder comprises a stream of input metrics 32 output from a demodulator. If the decoder comprises a weighting function 36, the input metrics are summed with weighted metrics 37 output from the weighting function to generate summed metrics 35. The summed metrics are input to the hard decision algorithm which is adapted to generate hard decisions from the summed metric stream. The particular algorithm used is not relevant to the invention and any suitable algorithm may be used in accordance with the particular implementation.

The output of the hard decision algorithm comprises the one or more hard decisions 41 which are stored in the hard decision data memory. Depending on the implementation, the hard decision algorithm may be adapted to generate more than one hard decision. For example, the hard decisions corresponding to the first and second maximums are generated which are subsequently used by a soft decision decoder 48.

The hard decision algorithm also generates updated metrics 39 associated with the hard decisions. The updated metrics are accumulated and stored in the metrics memory. The updated metrics are accumulated over all the repeated transmit segments. For example, consider a system that uses codewords as the transmit units and each codeword is transmitted four times. In this case, the updated metrics for the four repeated codewords are accumulated in the metrics memory. Optionally, the metrics memory is adapted to store the normalized average of the accumulated metrics.

The contents stored in the metrics memory are output as cumulative metrics 43 to the optional weighting function. The weighting function may be used to apply different weights to the accumulated metrics. For example, more or less weight may be applied to the transmit units transmitted earlier rather than the ones transmitted later. Alternatively, the transmit units are transmitted using different amplitudes, or the codewords transmitted may not be the same but may be different for each transmission of the transmit unit. Regardless of the scheme, the weighted metrics 37 output of the weighting function are summed by the summer and the resultant summed metrics are fed into the hard decision algorithm during the next cycle.

The use of a soft decision decoder (i.e. error correcting code) is optional. If the cumulative decoder incorporates a soft decision decoder 48, the hard decisions 44 and metrics 46 associated therewith are input to the soft decision decoder after the last repetition of each codeword. For example, assuming a repetition code of four codewords, the hard decisions and associated metrics are input to the soft decision decoder every fourth codeword. The output of the soft decision decoder comprises the decoded data output stream 50 of the cumulative decoder.

In accordance with the invention, the actual repetition code used is not crucial to the operation of the invention. The invention contemplates any repetition code suitable for use in accordance with the particular implementation.

Cumulative Decoder Adapted for CSK Communication Systems

Figure 2:
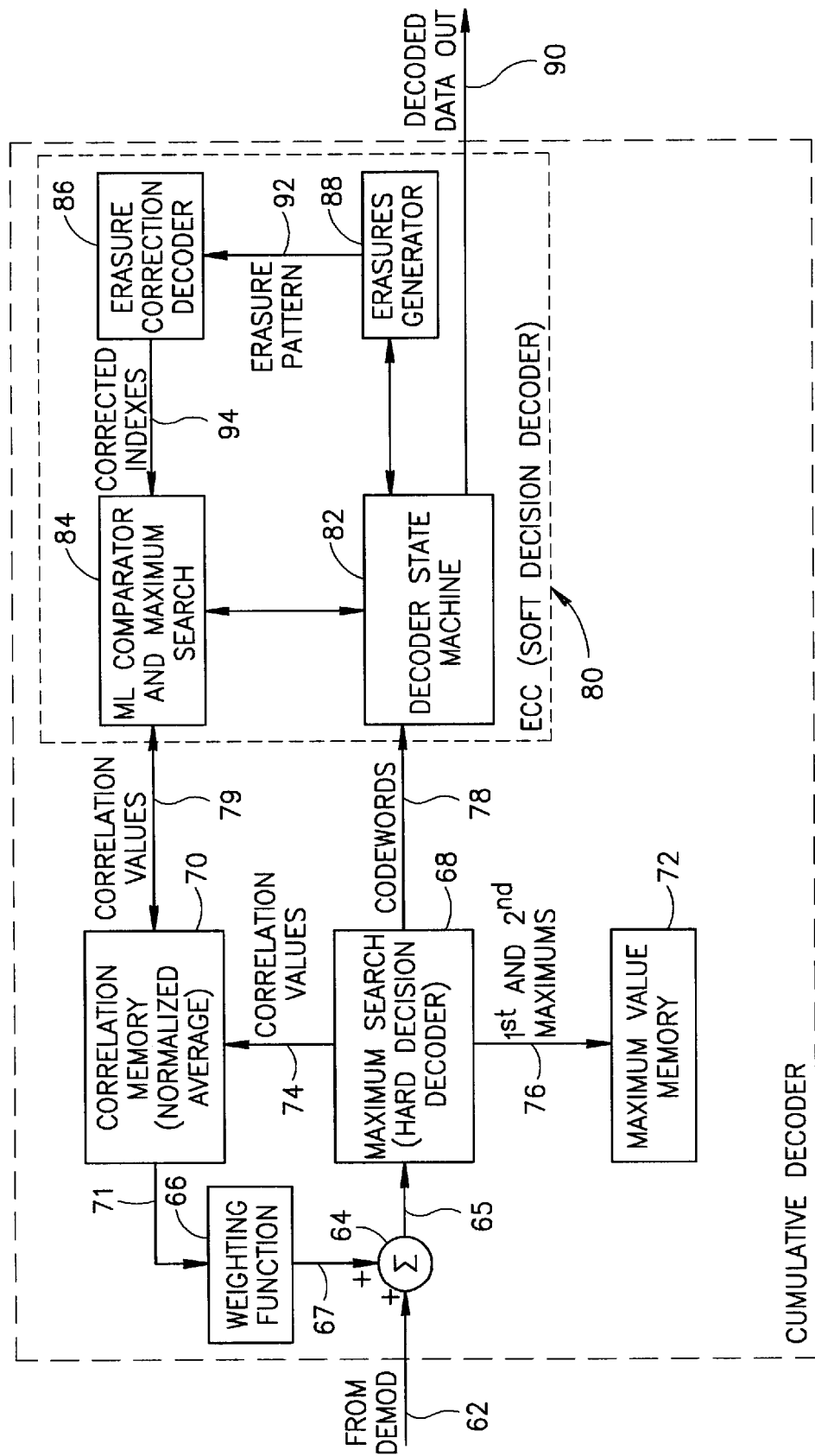
FIG. 2 is a diagram of a second embodiment of a cumulative decoder adapted for use with spread spectrum modulated signals constructed in accordance with the present invention adapted to output hard decisions and associated metrics to an Error Correcting Code circuit.

A diagram of a second embodiment of a cumulative decoder adapted for use with spread spectrum modulated signals constructed in accordance with the present invention adapted to output hard decisions and associated metrics to an Error Correcting Code circuit is shown in FIG. 2. The cumulative decoder, generally referenced 60, comprises a hard decision decoder 68, maximum value memory 72, correlation memory 70, weighting function 66 and summer 64. Note that the description of the operation of the decoder 60 is presented in the context of a system wherein the transmit units are codewords.

The input to the decoder comprises a stream of input metrics 62 (i.e. correlation values) output from a demodulator. The input metrics are summed with weighted metrics 67 output from the weighting function to yield summed metrics 65. The summed metrics are input to the maximum search that is adapted to generate hard decision from the summed metric are input stream. The hard decision decoder is adapted to search over the summed input correlation values for P maximums wherein P is any positive integer. In addition, each codeword comprises S symbols wherein each symbol represents N bits. In this example, P=2 whereby the hard decision decoder searches for the first and second maximum values, S=7 and N=4. This is the transmit scheme used in DCSK4 a type of code shift keying modulation wherein each codeword is made up of five data symbols and two parity symbols, each symbol comprising four bits. CSK modulation is described in detail in Raphaeli cited supra. it is appreciated by one skilled in the art that other types of transmit units having different numbers of symbols, bits, etc. and using other modulation schemes can be used without departing from the scope of the present invention.

Once the one or more maximums are found, the indexes 76 corresponding to the first and second maximum correlation values are stored in the maximum value memory. The corresponding updated correlation values 74 are stored in the correlation memory. The correlation memory may optionally be adapted to calculate and store the normalized average of the correlation values. In accordance with the invention, the correlation values for each codeword received as part of the repetition code, are accumulated on a per symbol basis and stored in the correlation memory. In this fashion, the energy received from the channel is collected over several codeword times, thus improving the receiver SNR.

The cumulative metrics 71 in the correlation memory are output and input to an optional weighting function 66 which, if used, functions to apply a weighting function to the cumulative correlation values. For example, more or less weight may be applied to the transmit units transmitted earlier rather than the ones transmitted last. Alternatively, the transmit units are transmitted using different amplitudes, or the codewords transmitted may not be the same but may be different for each transmission of the transmit unit.

The weighted metrics 67 output of the weighting function are summed with the input metrics 62 of the subsequent codeword via summer 64 to generate summed metrics 65 therefrom which are then input to the hard decision decoder (maximum search).

Note that the maximum value memory must be sufficiently large enough to store the index of the correlation value corresponding to the first and second maximums for each symbol in a codeword, e.g., 2×7=14 symbols. Assuming 4 bits/symbol, the correlation memory must be sufficiently large enough to store the correlation values for all 16 possible values of each symbol in the codeword, e.g., 16×7=112.

The cumulative decoder also comprises an optional ECC or soft decision decoder 80 comprising a decoder state machine 82, erasure generator 88, erasure correction decoder 86 and maximum length (ML) comparator and maximum search unit 84. In operation, codewords 78 are input to the decoder state machine and the erasure generator functions to generate erasure patterns 92. Corrected indexes 94 produced by the erasure correction generator are used by the ML comparator and maximum search unit, which has access to the correlation memory, to determine the most likely codeword received. The output of the ECC comprises the decoded output data 90.

Thus, assuming a repetition code of four, i.e. each codeword is transmitted four times, the cumulative decoder is adapted to receive the first codeword and process the correlation values in the same fashion as reception in a non-accumulation mode of operation, i.e. the contents of the correlation and maximum value memories are zeroed out initially. Once the first codeword is completely received, the process of cumulative decoding begins.

As described above, the correlation values of the second, third and fourth codewords are accumulated with the correlation values stored in the correlation memory such that the energy of the received codewords are accumulated over a period of time four times longer than without the present invention. After all four codewords have been received, the process of error correction begins.

An advantage of the present invention is its simplicity of implementation in that one skilled in the art may implement the present invention easily using existing receiver designs. The existing maximum search algorithm typically does not need to be modified since it receives the correlation values after the accumulation process and is operative to perform the maximum search and associated writing to the memories using the same procedure as in non-cumulative modes of operation. In addition, no modifications need be made to the error correction algorithms other than modifying the trigger to start decoding. In the present invention, the trigger to start decoding is delayed until after the last repetition of each transmit unit, e.g., until after the fourth codeword in the example above.

Note that the present invention is not limited to any particular error correction algorithm. One skilled in the art may utilize the cumulative decoder with other soft decision decoders without departing from the scope of the invention. Another ECC suitable for use with the present invention is described in U.S. application Ser. No. 09/686,237, filed Oct. 11, 2000, entitled "Soft Decision Maximum Likelihood Encoder and Decoder," incorporated herein by reference in its entirety.

EXAMPLE TRANSMITTER INCORPORATING REPETITION CODE

Figure 3:
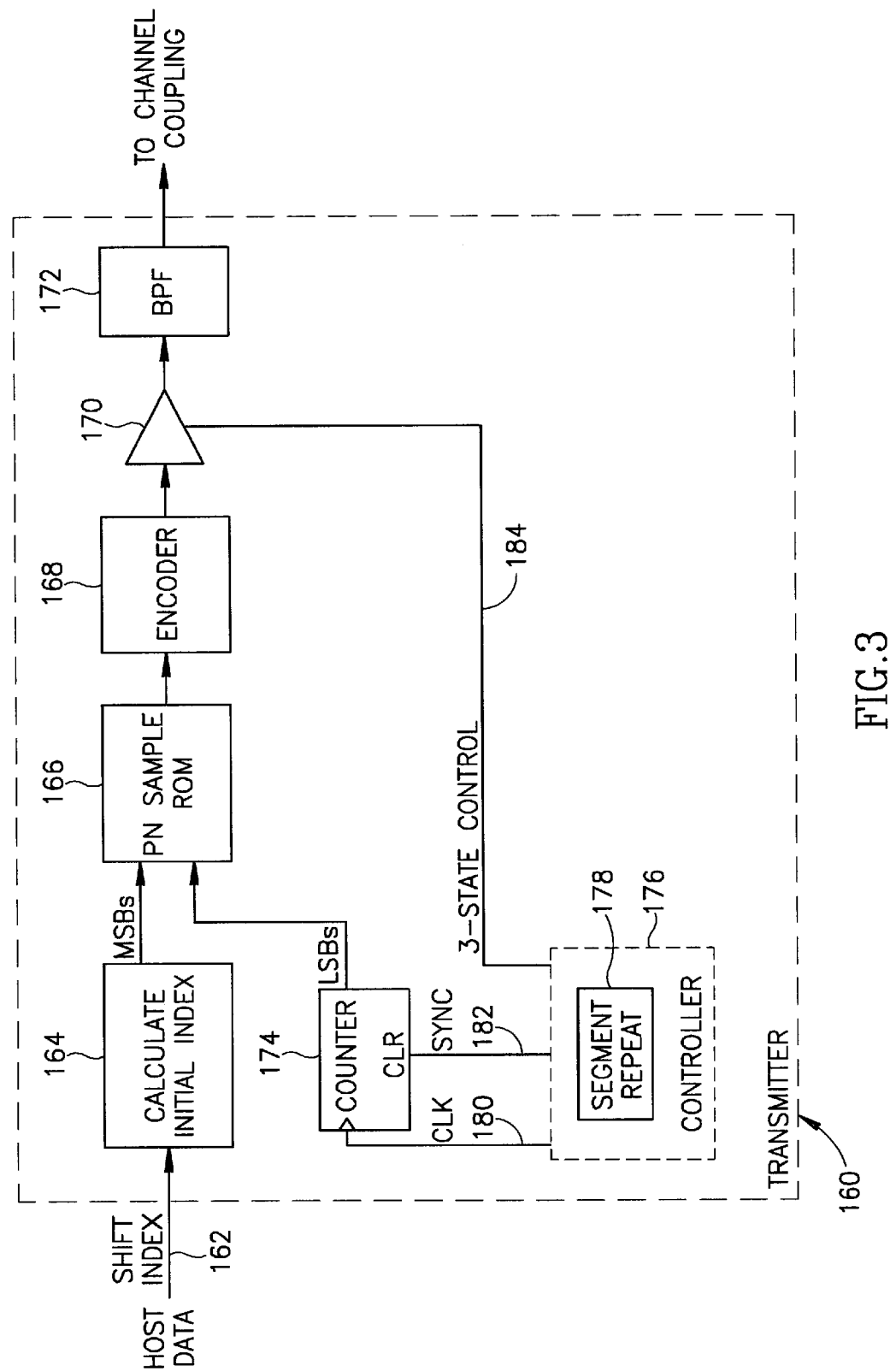
FIG. 3 is a diagram illustrating an embodiment of a transmitter adapted to repeat segments of an input data stream in accordance with the present invention.

A diagram illustrating an embodiment of a transmitter adapted to repeat segments of an input data stream in accordance with the present invention is shown in FIG. 3. The transmitter, generally referenced 160, comprises an initial index calculation circuit 164, counter 174, PN sample ROM 166, encoder 168, gate 170 and band pass filter (BPF) 172. A controller 176 incorporating a transmit segment repeater unit 178 provides the clock 180 and synchronization 182 signals to control the generation of symbols. A more detailed description of the transmitter that can be adapted for use with the present invention can be found in U.S. application Ser. No. 09/449,880, filed on Nov. 30, 1999, entitled "A Code Shift Keying Transmitter For Use In A Spread Spectrum Communications System," similarly assigned and incorporated herein by reference in its entirety.

In accordance with the CSK modulation example presented herein, the spreading waveform, i.e. the PN sequence, for each symbol is circularly rotated by a specific number of sample positions corresponding to the number of bits of information to be conveyed in the symbol. For example, for DCSK4, each symbol conveys four bits of information. Thus, each sample has 16 possible rotations. In addition to the rotation, the sign of the phase of the symbol may be used to convey an additional bit.

A host provides the data to be transmitted, including the header, i.e., preamble, data and CRC checksum sequence already generated. The host data to be transmitted is input to the initial index calculation circuit. The host data is used to determine the shift index that is between 0 and $2^n-1$, where n represents the number of bits transmitted per symbol (excluding the polarity bit). With 16 samples, the shift index is a number between 0 and $2^4-1=15$.

The initial index into the PN sequence is calculated by dividing the length of the PN sequence by the total number of symbols in the encoding set, e.g., $2^n$, and multiplying by the shift index as given below in Equation 1.

$$\text{initial\_index} = \left( \frac{PN \text{ sequence length}}{\text{number of possible shifts}} \right) \cdot \text{shift\_index} \quad (1)$$

For example, consider a PN sequence length equal to 128 and the number of possible shifts equal to 16, i.e., the total number of possible symbols or shift indexes. Assuming the host data (i.e., the shift index) input to the calculation circuit is 13 (may range from 0 to 15) then the initial index is equal to 104. In this case, the symbols are spaced apart from each other by 8 and are equal to 0, 8, 16 . . . 112, 120.

The output of the initial index calculation circuitry forms the MSB portion of the address inputs to the PN sample ROM. In operation, the LSBs of the PN sample ROM are formed from the output of the counter. The counter is adapted to count modulo the PN sequence length. The counter is clocked by a suitable clock source 180 at the same rate bits are to be clocked out of the sample ROM. The counter is cleared every symbol period by a SYNC signal 182 input to the clear input of the counter. The number of bits output of the counter depends on the length of the PN sequence.

The bits output of the counter are input to the LSBs of the PN sample ROM forming the lower portion of the address. The upper portion of the address is the output of the initial index calculation circuitry which functions to select one of the PN sequences stored in the ROM. The output of the counter cycles through the entire PN sequence for that symbol. The bits output from the PN sample ROM represent the PN sequence rotated in accordance with the shift index, i.e., the data input from the host.

Figure 5:
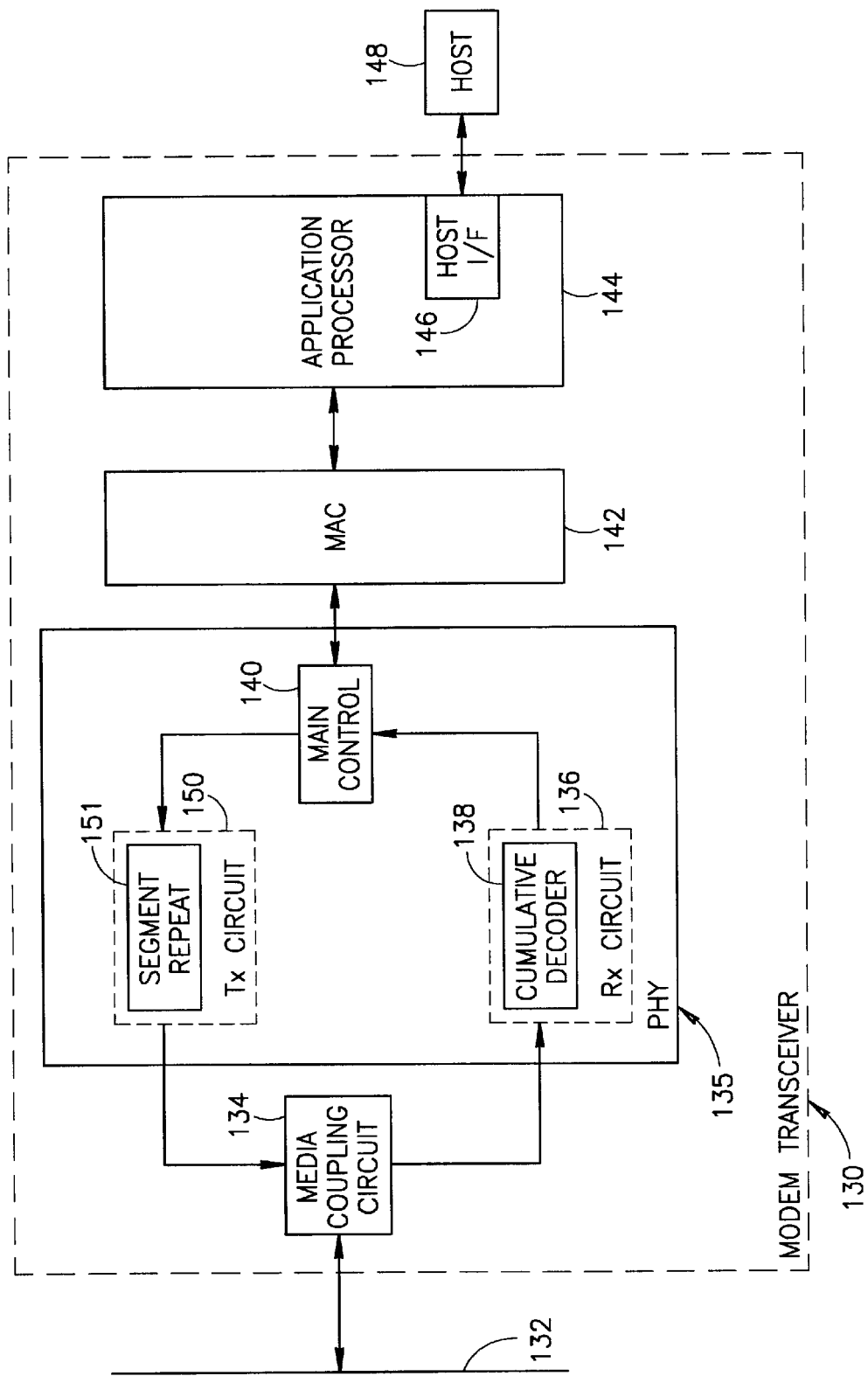
FIG. 5 is a block diagram illustrating an example embodiment of a station incorporating the repeating segment transmitter and cumulative decoder of the present invention.

The output of the PN sample ROM is input to an encoder which functions to encode the bits input thereto in accordance with an encoding scheme. Any suitable encoding scheme may be used with the present invention. The output of the encoder is input to a gate that functions as an output amplifier generating the necessary drive currents required to drive the channel. Preferably the gate is adapted to have a tri-state control 184 that is asserted when the device is in receive mode and the transmitter is temporarily shut off. The output of the gate is input to a band pass filter that functions to generate the desired spectrum. The output of the BPF is input to channel (i.e. media) coupling circuitry 134 (FIG. 5). The channel coupling circuitry functions to passively couple the analog signal output of the BPF to the channel.

In accordance with the invention, the controller is adapted to repeat each transmit segment a predetermined number of times according to the desired repetition code. Considering a repetition code of four and transmit segments comprising codewords, the segment repeat is operative to repeat the transmission of each codeword four times. If the transmit segment comprise symbols, then each symbol is repeatedly transmitted a predetermined number of times.

EXAMPLE RECEIVER INCORPORATING CUMULATIVE DECODER

Figure 4:
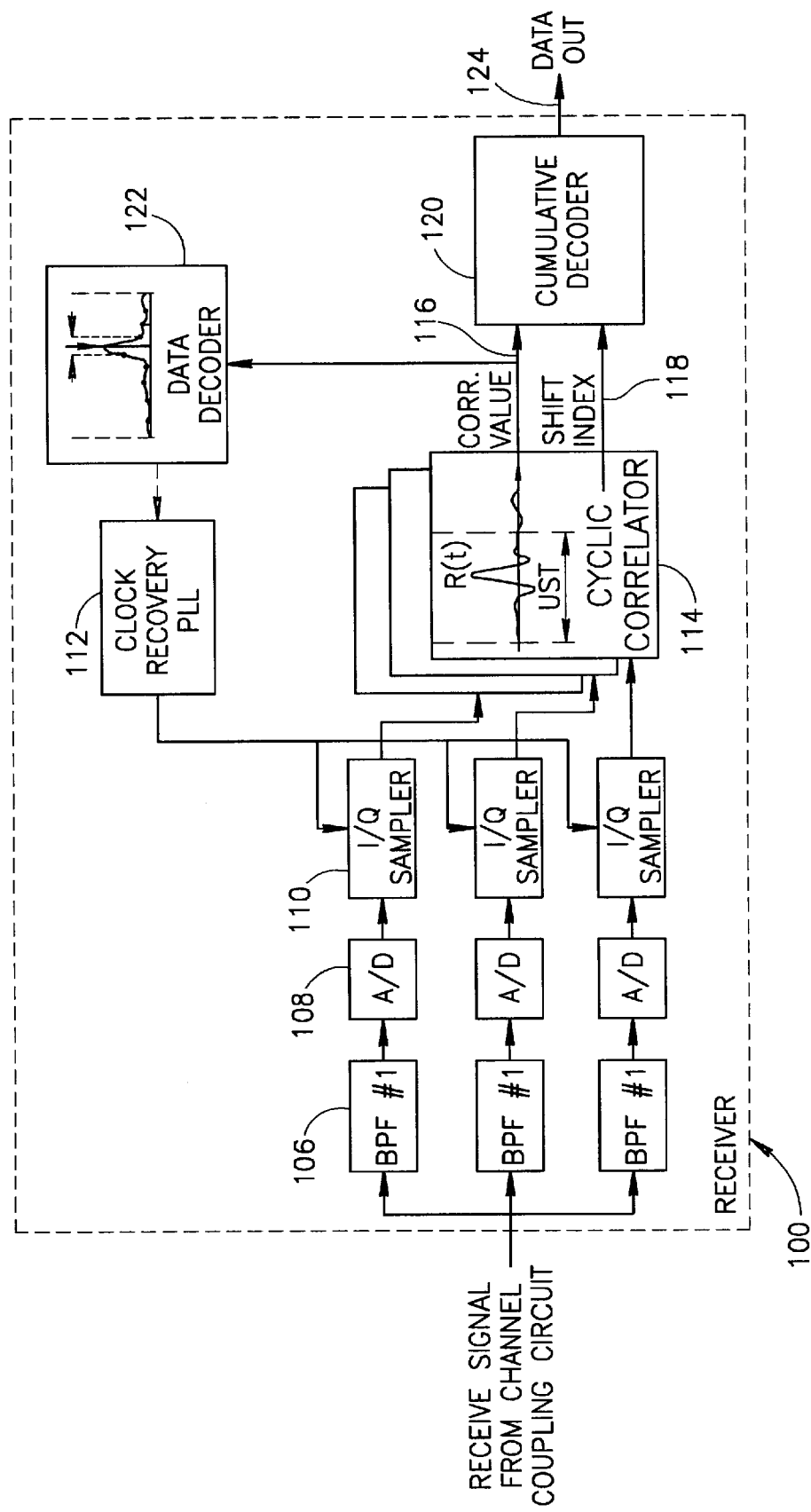
FIG. 4 is a diagram illustrating an embodiment of a receiver incorporating the cumulative decoder of the present invention.

An example CSK receiver incorporating the error correcting code method of the present invention will now be described in more detail. A diagram illustrating on embodiment of a receiver incorporating the cumulative decoder of the present invention is shown in FIG. 4. A detailed description of the CSK receiver can be found in U.S. application Ser. No. 09/551,449, filed on Apr. 18, 2000, entitled "A Receiver For Use In A Code Shift Keying Spread Spectrum Communications System," similarly assigned and incorporated herein by reference in its entirety. A brief description is presented below.

The CSK receiver, generally referenced 100, comprises a band pass filter (BPF) bank 106, A/D converters 108, I/Q samplers 110, a plurality of complex cyclic correlators 114 and cumulative decoder 120 constructed in accordance with the present invention. The receiver also comprises a data decoder 122 and clock recovery phase locked loop (PLL) 112.

The receive signal from the channel coupling circuit 134 (FIG. 5) is input to three band pass filters, labeled BPF #1 through BPF #3. The three BPFs are constructed to cover a portion of a suitable frequency range such as the 120–400 kHz band (for use in the United States) or 20–80 kHz and 95–125 kHz band (for use in Europe). Multiple bands are used in order to achieve an increase in reliability. In the case of three bands, two of the bands can be corrupted with noise and fail to receive and the receiver logic of the remaining band may still be able to output correct data. In addition, the splitting of the received signal to three bands has the advantage of making the receiver more immune to phase distortions.

The output of each band pass filter is input to a one-bit A/D converter. The binary output of each of the one bit A/D converters is sampled by I/Q samplers at the sampling frequency $f_s$ forming an I and Q data stream. The Q samples are generated by sampling at the sampling frequency $f_s$ after being delayed a period of $$\frac{1}{4f_o}$$

by a delay circuit (not shown) the output of which forms a 90 degree quadrature Q bit stream. Each of the I and Q data streams within each band are input to a complex cyclic correlator which functions to correlate the input data with a template. The complex correlation function is operative to detect the amount of rotation in the symbol. The received data is clocked into a shift register and circularly rotated. For each rotation shift, the correlator generates a correlation sum. The correlation results for both the I and Q data steams are summed over each band to yield a correlation sum 116 and corresponding shift index 118, both of which make up the metrics input to the cumulative decoder. The cumulative decoder is adapted to perform the cumulative decoding method of the present invention to yield the original transmitted data with improved reliability.

The correlation sum is also input to data decoder which functions to find the peak in the correlation sum. The peak is used by the clock recovery PLL circuit to derive the clock timing for the A/D converters and I/Q samplers. The peak index is chosen corresponding to a maximum correlation sum. A shift index is chosen during each UST corresponding to the shift index that yields the maximum correlation sum. This shift index represents the original rotation applied to the transmitted symbol. The shift index represents the hard decision and is input to the soft decision decoder where it is used in the decoding process.

Station Incorporating the Robust Communications Mechanism

The robust communications mechanism of the present invention may be incorporated in a communications transceiver such as a station, network node, modem, transceiver, etc. One example application is in a digital modem adapted for communications over the power line medium using a near baseband spread spectrum-modulated signal that is coherently decoded. The modem utilizes a 120–400 kHz band (for use in the United States) or 20–80 kHz and 95–125 kHz band (for use in Europe). The modulation used is so called CSK or DCSK and the modem is capable of unicast, broadcast and multicast transmissions using the spread spectrum modulated signal in the appropriate band. The transmission protocol is packet oriented whereby each packet transmitted comprises some type of header including a synchronization sequence which permits the receiver to synchronize on the spreading waveform (e.g., chirp, PN sequence, etc.) followed by the packet data modulated as circularly shifted spreading waveforms. The synchronization sequence is processed through a linear correlator while the data is decoded using cyclic correlation.

A block diagram illustrating an example embodiment of a station incorporating a transmitter and receiver adapted to implement the repetition code and cumulative decoder of the present invention, respectively, is shown in FIG. 5. The modem, generally referenced 130, represents a modem that may operate on a stand alone basis or may be incorporated within a network device such as a switch, router, hub, broadband modem, cable modem, PLC based modem, etc. for performing communication functions (i.e. implementing OSI stack protocol functions including MAC functionality). The modem comprises an application processor 144 with associated static, dynamic, volatile and/or non-volatile memory (not shown) in communication therewith. The application processor is also in communication, via a host interface 146, with a host device 148. The host may be adapted to communicate over one or more networks, e.g., LAN, WAN, MAN, PAN, etc.

The station comprises media coupling circuitry 134 for interfacing the modem via the PHY circuit 135 to the shared medium 132 which may comprise the power line, twisted pair, wireless, IR, optical, etc. The PHY circuit comprises a main control 140, transmit circuit 150 and receive circuit 136. The transmit circuit and receive circuit communicate over the medium via the media coupling circuitry.

In the transmit direction, the main control functions to accept data from the MAC for transmission and to forward it to the transmit circuit. The transmit circuit receives data for transmission from the main control and functions to encode the data into symbols which are then encoded into codewords and subsequently modulated and transmitted over the medium. The transmit circuit comprises segment repeat means 151 adapted to implement a predetermined repetition code known to both the transmitter and the receiver. The segment repeat means is adapted to repeat the codeword to be transmitted a predetermined number of times in accordance with the robust communications mechanism of the present invention as described in detail supra.

In the receive direction, the receive circuit in the PHY functions to demodulate, correlate and cumulatively decode the signal received from the media coupling circuit and to generate received output data therefrom. The receive circuit incorporates a cumulative decoder 138 adapted to accumulate the energy of each codeword over a longer time period. As described in detail hereinabove, the cumulative decoder functions to collect the energy of repetitively transmitted codewords thus improving the reliability of transmission. The received output data is forwarded to the MAC via the main control.

The media access controller (MAC) 142 functions, on one side, to output transmit data to the transmit circuit and to input receive data from the receive circuit. On the processor side, it interfaces to the application processor. The MAC is adapted to implement any suitable layer 2 (i.e. data link layer) media access control technique such as those well known in the art. A MAC suitable for use with the present invention is described in U.S. patent application Ser. No. 09/883,589, filed Jun. 18, 2001, entitled "Channel Access Method for Powerline Carrier Based Media Access Control Protocol," similarly assigned and incorporated herein by reference in its entirety.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of cumulatively decoding input metrics corresponding to a demodulated received signal transmitted as a sequence of segments wherein a segment at a transmitter is repeated a predetermined number of times, said method comprising the steps of:

summing said input metrics with weighted metrics for each repeated segment so as to generate a single set of cumulative metrics therefrom;

applying a hard decision algorithm to said cumulative metrics and generating hard decisions and updated metrics associated with said hard decisions in response thereto;

accumulating said updated metrics associated with said hard decisions over a plurality of segments and applying a weighting function so as to generate said weighted metrics therefrom; and repeating said steps of summing, applying and accumulating for each repeated segment.

2. The method according to claim 1, further comprising the step of providing a soft decision decoder adapted to generate output data from said hard decisions and said updated metrics.

3. The method according to claim 1, wherein said sequence of segments comprises a sequence of codewords.

4. The method according to claim 1, wherein said sequence of segments comprises a sequence of symbols.

5. The method according to claim 1, wherein said sequence of segments comprises a sequence of bits.

6. The method according to claim 1, wherein said updated metrics associated with said hard decisions comprise spread spectrum correlator values.

7. The method according to claim 1, wherein each codeword at the transmitter is transmitted four times and wherein output data is generated after the accumulation of input metrics over a four codeword period.

8. The method according to claim 1, wherein said steps of summing, applying and accumulating are repeated four times.

9. The method according to claim 1, wherein said method is implemented in an Application Specific Integrated Circuit (ASIC).

10. The method according to claim 1, wherein said method is implemented in a Field Programmable Gate Array (FPGA).

11. A cumulative decoder for decoding input metrics corresponding to a demodulated received signal transmitted as a sequence of segments wherein a segment at a transmitter is repeated a predetermined number of times, comprising:

summing means adapted to sum said input metrics with cumulative metrics for each repeated segment generating a single set of summed metrics therefrom;

search means for applying a hard decision algorithm to said summed metrics and generating hard decisions and updated metrics associated with said hard decisions in response thereto;

accumulating means for accumulating said updated metrics generated by said search means over each repeated segment so as to generate said cumulative metrics therefrom; and wherein said updated metrics are generated and accumulated over said predetermined number of segments.

12. The decoder according to claim 11, further comprising weighting means adapted to apply a weighting function to said cumulative metrics before summation by said summing means.

13. The decoder according to claim 11, wherein said search means comprises means for performing a maximum search.

14. The decoder according to claim 11, wherein said search means comprises means for performing a search for a first maximum and a second maximum.

15. The decoder according to claim 11, further comprising a soft decision decoder adapted to generate output data from said hard decisions and said cumulative metrics.

16. The decoder according to claim 11, wherein said sequence of segments comprises a sequence of codewords.

17. The decoder according to claim 11, wherein said sequence of segments comprises a sequence of symbols.

18. The decoder according to claim 11, wherein said sequence of segments comprises a sequence of bits.

19. The decoder according to claim 11, wherein said input metrics comprise spread spectrum correlator values.

20. The decoder according to claim 11, wherein said accumulating means comprises means for storing a normalized average of said cumulative metrics.

21. The decoder according to claim 11 adapted to be implemented in an Application Specific Integrated Circuit (ASIC).

22. The decoder according to claim 11 adapted to be implemented in a Field Programmable Gate Array (FPGA).

23. A cumulative decoder for decoding input correlation values corresponding to a demodulated received signal transmitted as a sequence of codewords wherein a codeword at a transmitter is repeated one or more times, comprising:

summing means adapted to sum said input correlation values with cumulative correlation values for each repeated codeword so as to yield a single set of summed correlation values therefrom;

search means adapted to perform a maximum search on said summed correlation values and to generate one or more maximum values corresponding to hard decisions and updated correlation values in response thereto;

accumulating means for accumulating said updated correlation values generated by said search means over a plurality of codewords so as to generate said cumulative correlation values therefrom; and wherein for each output codeword, said cumulative correlation values are accumulated over all repeated codewords.

24. The decoder according to claim 23, further comprising means for applying a weighting function to said cumulative correlation values before summation by said summer.

25. The decoder according to claim 23, wherein said accumulating means comprises correlation memory adapted to maintain and store a normalized average of said updated correlation values.

26. The decoder according to claim 23, wherein said search means comprises means for performing a search for a first maximum and a second maximum.

27. The decoder according to claim 23, further comprising a soft decision decoder adapted to generate output data from said hard decisions and said cumulative correlation values associated therewith.

28. The decoder according to claim 23 adapted to be implemented in an Application Specific Integrated Circuit (ASIC).

29. The decoder according to claim 23 adapted to be implemented in a Field Programmable Gate Array (FPGA).

30. A method of cumulative decoding input correlation values corresponding to a demodulated received signal transmitted as a sequence of codewords wherein a codeword at a transmitter is repeated one or more times, comprising:

summing said input correlation values with cumulative correlation values for each repeated codeword so as to yield a single set of summed correlation values therefrom;

performing a maximum search on said summed correlation values and generating one or more maximum values corresponding to hard decisions and updated correlation values in response thereto;

accumulating said updated correlation values generated by said search means over each repeated codeword so as to generate said cumulative correlation values therefrom; and wherein for each output codeword, said cumulative correlation values are accumulated over all repeated codewords.

31. The method according to claim 30, further comprising the step of applying a weighting function to said cumulative correlation values before summation by said summer.

32. The method according to claim 30, wherein said step of accumulating comprises maintaining and storing a normalized average of said updated correlation values.

33. The method according to claim 30, wherein said step of performing a maximum search comprises searching for a first maximum and a second maximum.

34. The method according to claim 30, further comprising the step of providing a soft decision decoder adapted to generate output data from said hard decisions and said cumulative correlation values.

35. The method according to claim 30, wherein said method is implemented in an Application Specific Integrated Circuit (ASIC).

36. The method according to claim 30, wherein said method is implemented in a Field Programmable Gate Array (FPGA).

37. A method of robust communications in a shared communications media based network wherein original transmit data is encoded and repetitively transmitted N times to form N sub-transmissions, said method comprising the steps of:
- generating a demodulated signal from a signal received over said network;
- decoding and generating updated metrics for each of said N sub-transmissions within said demodulated signal, and accumulating said updated metrics to generate a single set of cumulative metrics, thereby accumulating energy in the received signal over a period of time N times longer than said original transmit data;
- performing soft decision decoding on said cumulative metrics so as to generate output data therefrom; and
- wherein N is a positive integer.

38. The method according to claim 37, wherein N equals 4.

39. The method according to claim 37, wherein said original transmit data comprises a plurality of codewords whereby each codeword is transmitted N times.

40. The method according to claim 37, wherein said original transmit data comprises a plurality of symbols whereby each symbol is transmitted N times.

41. The method according to claim 37, wherein said original transmit data comprises a plurality of bits whereby each bit is transmitted N times.

42. The method according to claim 37, wherein said method is implemented in an Application Specific Integrated Circuit (ASIC).

43. The method according to claim 37, wherein said method is implemented in a Field Programmable Gate Array (FPGA).

44. A modem transceiver for transmitting and receiving signals in a shared communications media based network, comprising:
- a coupling circuit for generating a receive signal received over said network and for outputting a transmit signal onto said network;
- a transmitter adapted to modulate data to be transmitted in accordance with a modulation scheme so as to generate a transmit waveform therefrom, said transmitter comprising a segment repeater adapted to repeatedly transmit each input segment a predetermined number of times;
- a receiver to demodulate said receive signal in accordance with said modulation scheme so as to generate a receive data signal therefrom, said receiver comprising a cumulative decoder for decoding input metrics corresponding to a demodulated received signal transmitted as a sequence of segments wherein a segment at a corresponding transmitter is repeated one or more times, said cumulative decoder comprising:
- summing means adapted to sum said input metrics with cumulative metrics for each repeated segment to yield a single set of summed metrics therefrom;
- search means for applying a hard decision algorithm to said summed metrics and generating hard decisions and updated metrics associated with said hard decisions in response thereto;
- accumulating means for accumulating said updated metrics generated by said search means for each repeated segment so as to generate said cumulative metrics therefrom;
- wherein for each output segment generated, updated metrics are generated and accumulated all repeated segments;
- a media access control (MAC) circuit adapted to interface an application processor to said shared communications media; and
- said application processor adapted to control the operation of said transmitter, receiver and MAC and to provide an interface between said MAC and an external host.

45. The modem according to claim 44, wherein said modulation scheme comprises code shift keying (CSK) modulation.

46. The modem according to claim 44, wherein said receiver further comprises weighting means adapted to apply a weighting function to said cumulative metrics before summation by said summing means.

47. The modem according to claim 44, wherein said sequence of segments comprises a sequence of codewords.

48. The modem according to claim 44, wherein said sequence of segments comprises a sequence of symbols.

49. The modem according to claim 44, wherein said sequence of segments comprises a sequence of bits.

50. The modem according to claim 44, wherein said hard decision metrics comprise spread spectrum correlator values.

51. The modem according to claim 44, further comprising a soft decision decoder adapted to generate output data from said hard decisions and said cumulative metrics.

52. The modem according to claim 44 adapted to be implemented in an Application Specific Integrated Circuit (ASIC).

53. The modem according to claim 44 adapted to be implemented in a Field Programmable Gate Array (FPGA).

* * * * *